(12) United States Patent
Patel (10) Patent No.: US 11,580,130 B2
(45) Date of Patent: Feb. 14, 2023

(54) SELF-ADJUSTING CONNECTION POOL IN A DISTRIBUTED SYSTEM

(71) Applicant: PAYPAL, INC., San Jose, CA (US)

(72) Inventor: Jaykumar Patel, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/515,351

(22) Filed: Oct. 29, 2021

(65) Prior Publication Data

US 2022/0121672 A1    Apr. 21, 2022

Related U.S. Application Data

(63) Continuation of application No. 16/713,833, filed on Dec. 13, 2019, now Pat. No. 11,176,155.

(51) Int. Cl.
  *G06F 16/25*    (2019.01)
  *H04L 43/04*    (2022.01)

(52) U.S. Cl.
  CPC .......... *G06F 16/252* (2019.01); *H04L 43/04* (2013.01)

(58) Field of Classification Search
  CPC ....... H04L 67/14; H04L 41/22; H04L 47/822; H04L 47/823; H04L 47/826
  See application file for complete search history.

(56) References Cited

U.S. PATENT DOCUMENTS

| | | | | |
|---|---|---|---|---|
| 7,702,796 B2* | 4/2010 | Shen | ........................ | H04L 67/14 709/227 |
| 9,098,565 B1* | 8/2015 | Kumarjiguda | ........ | G06F 16/288 |
| 10,568,185 B1* | 2/2020 | Ostrovsky | ............... | H05B 45/37 |
| 10,958,590 B2* | 3/2021 | Jain | ...................... | H04L 41/0843 |
| 10,963,478 B2* | 3/2021 | Robison | ............... | H04L 43/0894 |
| 11,176,155 B2* | 11/2021 | Patel | ...................... | G06F 16/252 |
| 11,243,970 B2* | 2/2022 | D'Amore | ................ | G06F 17/10 |
| 2004/0045008 A1* | 3/2004 | June | ......................... | G06F 9/465 719/316 |
| 2004/0078495 A1* | 4/2004 | Mousseau | ................. | G06F 9/44 710/1 |
| 2004/0088413 A1* | 5/2004 | Bhogi | .................... | G06F 9/5061 709/226 |

(Continued)

FOREIGN PATENT DOCUMENTS

| CN | 106250500 A | * 12/2016 |
|---|---|---|
| CN | 107391633 A | * 11/2017 |

(Continued)

*Primary Examiner* — Shean Tokuta
(74) *Attorney, Agent, or Firm* — Haynes and Boone, LLP (57) ABSTRACT

A method includes calculating first connection usage information based on a first number of connections being used in a connection pool over a first time interval and adding a first number of database connections to the connection pool based on determining that the first connection usage information satisfies a first usage threshold. Additionally, the method includes calculating second connection usage information based on a second number of connections being used in the connection pool over a second interval. The second interval has been previously reset responsive to adding the first number of database connections to the connection pool. The method also includes determining whether to adjust the number of database connections in the connection pool based on the second connection usage information.

20 Claims, 6 Drawing Sheets

(56) References Cited

U.S. PATENT DOCUMENTS

| | | | |
|---|---|---|---|
| 2005/0144267 A1* | 6/2005 | Maron | G06F 11/3409 714/E11.207 |
| 2005/0172029 A1* | 8/2005 | Burke | H04L 67/141 709/227 |
| 2005/0251500 A1* | 11/2005 | Vahalia | G06F 16/1774 |
| 2006/0095572 A1* | 5/2006 | Burke | H04L 67/14 709/227 |
| 2007/0268910 A1* | 11/2007 | Shen | H04L 69/40 370/395.21 |
| 2010/0142366 A1* | 6/2010 | Bugenhagen | H04L 47/746 370/242 |
| 2014/0129746 A1* | 5/2014 | Zhou | G06F 16/22 707/739 |
| 2014/0324911 A1* | 10/2014 | de Lavarene | G06F 16/90 707/781 |
| 2014/0337562 A1* | 11/2014 | Long | G06F 3/0685 711/126 |
| 2015/0149361 A1* | 5/2015 | Lee | G06Q 20/40145 705/44 |
| 2016/0092271 A1* | 3/2016 | Jain | G06F 9/45558 718/1 |
| 2016/0182401 A1* | 6/2016 | Dick | H04L 47/803 709/226 |
| 2016/0259812 A1* | 9/2016 | Wu | G06F 16/183 |
| 2017/0116207 A1* | 4/2017 | Lee | G06F 16/27 |
| 2018/0019922 A1* | 1/2018 | Robison | H04L 43/0876 |
| 2018/0375927 A1* | 12/2018 | Nozawa | H04L 43/16 |
| 2019/0005047 A1* | 1/2019 | D'Amore | G06F 16/252 |
| 2020/0358713 A1* | 11/2020 | Jain | H04L 47/822 |
| 2021/0011797 A1* | 1/2021 | Robison | G06F 11/0757 |
| 2021/0056123 A1* | 2/2021 | Lee | G06F 16/178 |
| 2021/0182303 A1* | 6/2021 | Patel | G06F 16/252 |

FOREIGN PATENT DOCUMENTS

| | | | | |
|---|---|---|---|---|
| CN | 108549592 A | * | 9/2018 | |
| CN | 109800261 A | * | 5/2019 | |
| CN | 110012075 A | * | 7/2019 | G06Q 40/02 |
| CN | 112732441 A | * | 4/2021 | |
| CN | 112738205 A | * | 4/2021 | |
| CN | 113377784 A | * | 9/2021 | |
| JP | 2009181481 A | * | 8/2009 | |
| WO | WO-2017063441 A1 | * | 4/2017 | G06F 11/2058 |

\* cited by examiner

SELF-ADJUSTING CONNECTION POOL IN A DISTRIBUTED SYSTEM

CROSS REFERENCE TO RELATED APPLICATIONS

The present application is a continuation of U.S. patent application Ser. No. 16/713,833 filed Dec. 13, 2019, the contents of which are hereby incorporated by reference in their entirety for all purposes.

BACKGROUND

Technical Field

This disclosure relates generally to database systems and, more specifically, to adjusting the size of a connection pool in a database system.

Description of the Related Art

Connection pools are used to facilitate access to database system by various applications. As such, when an application accesses the database system, the application selects an available database connection from the connection pool to connect to the database system. Subsequently, when the database operation(s) initiated by the application is complete, the selected database connection is returned back to the connection pool where it is available to be used for another connection to the database system.

In certain instances, the size of the connection pool can include a relatively large number of database connections in order to meet period of high demand for access to the database system. As a result, however, during period of low demand, many database connections in the connection pool may remain unused, thereby consuming valuable computing resources.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "short-term module configured to determine connection usage value over a first time interval" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for an algorithm for adjusting the size of a connection pool in a database system. In certain embodiments, a database system may be configured to maintain a connection pool to facilitate database connections to a data source. For example, various applications may need to access the data source in the course of normal operations.

In order to facilitate the access, a database system may maintain a connection pool of one or more database connections. As such, each time an application needs to access information from the data source, the database system provides a database connection from the connection pool to the application.

In a typical database system environment, a developer of a first application may set a minimum and maximum number of database connections that can be used by the first application. Another developer of a second application may independently set a minimum and maximum number of database connections for the second application. In other words, the developers of the first application and second application may be unaware of the connection usage patterns of their respective applications. Thus, in many instances, the developers will set the minimum number of database connections that can be used by their respective applications at a relatively high number to ensure that their respective applications have adequate access to the database system. This can result in a relatively large number of connections that remain unused, thereby consuming valuable computing resources.

Thus, the present disclosure contemplates a connection manager that manages the size of the connection pool in a database system based on connection usage patterns corresponding to the connection pool. According to certain embodiments, the connection manger may include a short-term module, a long-term module, and a spike module. The short-term module may be configured to sample connection usage over successive time intervals of a first length (e.g., 10 seconds) at a first sampling rate. At the end of each interval, the short-term module determines whether to adjust a size of the connection pool.

For example, the short-term module may determine the connection usage based on the samples collected over a first time interval (having the first length). Based on the connection usage over the first time interval, the short-term module estimates a first connection pool size (e.g., that satisfies the pattern of connection usage over the first time interval). If the first connection pool size is greater than the current size of the connection pool, the current size of the connection pool (e.g., the number of database connections in the connection pool) is then adjusted to match the first connection pool size. In other implementations, the connection usage over the first time interval is compared with a connection usage threshold. If the connection usage satisfies the connection usage threshold, the connection manager may increase the size of the connection pool by a first predetermined number of database connections.

The long-term module may be configured to sample database connection usage in the connection pool over a successive time intervals of a second length (e.g., 10 minutes) at a second sampling rate. The second length may be greater than the first length of the time intervals corresponding to the short-term module. In addition, the second sampling rate may be the same or may be different from the first sampling rate. The long-term module determines whether to adjust the size of the connection pool at the end of each time interval of the second length.

For instance, the long-term module may determine the database connection usage based on the samples collected over a second time interval (having the second length). Based on the database connection usage of the second time interval, the long-term module estimates a second connection pool size. The size of the connection pool is subsequently adjusted to match the second connection pool size.

In other implementations, the database connection usage over the second time interval with a threshold usage range having a minimum connection usage value at a first endpoint and a maximum connection usage value at the second endpoint. If the database connection usage falls within the connection usage range (e.g., between the minimum connection usage value and the maximum connection usage value and inclusive of the minimum connection usage value and maximum connection usage value), the connection manager may maintain the current size of the connection pool. If the database connection usage is greater than the maximum connection usage value, the connection manager increases the size of the connection pool by a second number of database connections. If the database connection usage is less than the minimum connection usage value, the connection manager decreases the size of the connection pool (e.g., reduces the number of database connections in the connection pool) by a third number of database connections. The second and third number of database connections may be determined by the long-term module based on the samples collected over the second time interval. In other implementations, the second and third number of database connections may be second and third predetermined number of connections, respectively.

According to a particular embodiment, the operation of the long-term module may be affected by the short-term module. For each time interval that the short-term module causes the size of the connection pool to increase, the time interval corresponding to the long-term module is reset. Further, all samples that were collected by the long-term module before the increase in the size of the connection pool are discarded. The long-term module begins a new interval of the second length for sampling the connection usage.

For instance, consider the above examples of the first time interval sampled by the short-term module and the second time interval sampled by the long-term module. In this example, the second time interval has been previously reset due to the short-term module increasing the size of the connection pool based on connection usage in the first time interval. Additionally, any samples collected by the long-term module during the previous time interval (of the second length) prior to the increase of the size of the connection pool are discarded.

According to certain embodiments, the spike module may be configured to determine when a spike in database connection usage occurs. To this end, the spike module may detect a spike if an increase in database connection usage within a third time interval satisfies a usage increase threshold. In response to the spike module detecting a spike, the connection manager may increase the size of the connection pool by an amount estimated by the spike module or a predetermined amount. Additionally, the spike module may associate a decay period with the detected spike in which the connection manager does not adjust the size of the connection pool in response to any subsequently detected spikes within the decay period.

Figure 1:
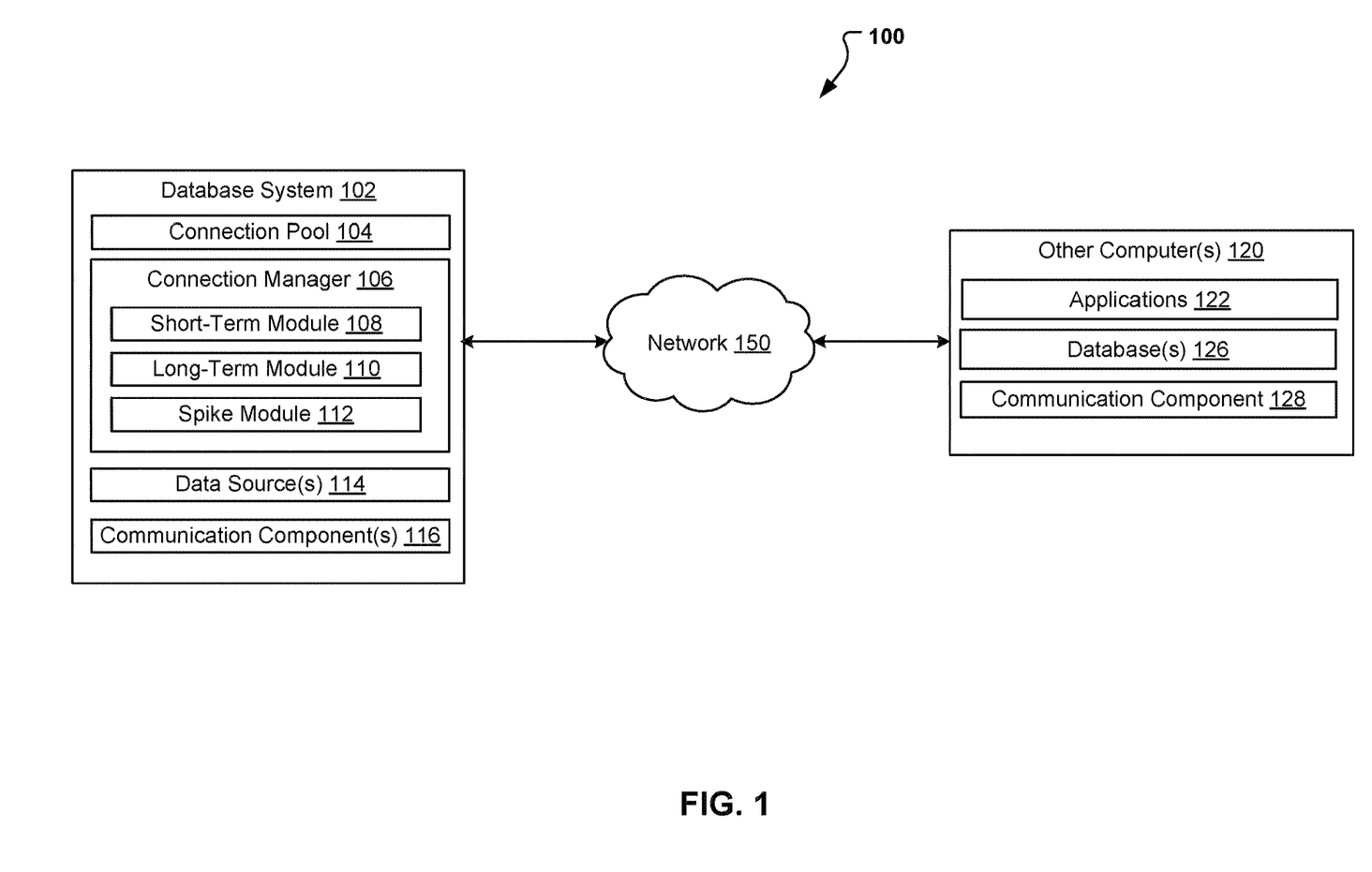
FIG. 1 is a block diagram illustrating an example system for adjusting the size of a connection pool in a distributed system, according to some embodiments.

FIG. 1 is a block diagram illustrating an example system 100 for adjusting the size of a connection pool in a database system. In the illustrated embodiment, the system 100 includes a database system 102 in communication with other computer(s) 120 via a network 150. The database system 102 may be configured to dynamically adjust the size of the connection pool 104 according to connection usage value. It will be appreciated that while FIG. 1 depicts database system 102, in other embodiments, the database system may be any other type of computer system, including a distributed computer system.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, database system 102 may include a connection pool 104, a connection manager 106, a data source 114, and communication components 116. The connection manager 106 may include a short-term module 108, a long-term module 110, and a spike module 112. Each of the components of the database system 102 may communicate with each other to adjust the size of a connection pool in a database system, as will be described in more detail below. Portions of FIG. 1 are described in conjunction with FIG. 2, FIG. 3A, and FIG. 3B.

The connection pool 104 represents a group of database connections (e.g., socket connections to the database system 102) that can be shared among various applications accessing the database system 102, such as applications 122 from other computers 120. For instance, each time an application accesses the database system 102 (e.g., to retrieve data from the data source(s) 114), the application may connect to the database system 102 via a database connection from the connection pool 104. When the application finishes the database operation associated with accessing the database system 102, the database connection is released back to the connection pool 104 for subsequent use by the application or other applications. In this manner, the number of database connections needed to service database requests from the applications can be reduced as unused connections from the connection 104 can be used and reused as needed.

However, in traditional database systems, the size of the connection pool can be imprecise relative to the needs of the various applications. For example, in some system environments, developers of different applications may program their respective applications to require a minimum number of database connections from the connection pool 104 to be allocated. Typically, the developers of a particular application are unaware of the traffic patterns (i.e., pattern of use for accessing the database system 102) of the other applications in the system environment. As such, each of the developers may program their respective applications to require a relatively high minimum allocation of database connections in order to ensure that the respective application's functionality with respect to the database system 102. Further, database connections are typically refreshed at certain intervals in order to ensure proper functionality. Refreshing database connections consumes CPU cycles and other computing resources. Thus, since the above described system environment may result in a relatively large number of unused database connections at any given moment, valuable computing resources may be wasted by refreshing the unused database connections.

In order to reduce the number of unused database connections in the connection pool 104, the connection manager 106 may be configured to manage the size of the connection pool 104 based on monitoring usage of the database connections (e.g., by the applications 122). As previously discussed, the connection manager 106 includes a short-term module 108, a long-term module 110, and a spike module 112. These modules may each be configured to monitor the connection usage at respective predetermined intervals. The respective predetermined intervals may be the same or may be different from each other. Moreover, based on operations of the connection manager 106, the size of the connection pool 104 may be increased (e.g., one or more connections may be added to the connection pool 104) or may be decreased (e.g., one or more connection may be removed from the connection pool 104).

The short-term module 108 is configured to sample connection usage over successive time intervals of a first length (e.g., 10 seconds) at a first sampling rate. At the end of each interval of the first length, the short-term module 108 estimates a connection pool size that would satisfy the pattern of connection usage indicated by the collected samples. Based on the estimated connection pool size, the short-term module 108 determines whether to increase a size of the connection pool 104. The long-term module 110 is configured to sample connection usage over successive time intervals of a second length (e.g., 10 minutes) that is greater than the first length. At the end of each interval of the second length, the long-term module 110 also estimates a connection pool size that would satisfy the pattern of connection usage indicated by its collected samples. Based on the estimated connection pool size, the long-term module 110 determines whether to adjust the size of the connection pool (e.g., whether to increase, decrease, or maintain the size). According to a particular embodiment, each time the short-term module 108 increases the size of the connection pool 104, the long-term module 110 and/or its current time interval at the time of adjustment is reset, and all of the sample collected by the long-term module 110 during its current time interval are discarded.

For example, the short-term module 108 determines a first connection usage value based on sampling connection usage over a first time interval of the first length while the long-term module 110 is still sampling connection usage within a second time interval of the second length. Based on the first connection usage value, the short-term module 108 estimates a first connection pool size. In some embodiments, the first connection usage value may correspond to a moving average of the number of connections from the connection pool 104 that are used over the first time interval (e.g., as indicated by the samples collected by the short-term module 108).

If the short-term module 108 determines that the first connection pool size is greater than the current size of the connection pool, the short-term module 108 causes the connection manager 106 to increase the current size of the connection pool 104 to match the first connection pool size. Further, the short-term module 108 also causes the long-term module 110 to reset (e.g., to have the second time interval for which it is currently sampling connection usage reset). Additionally, any samples that have been collected by the long-term module 110 within the second time interval are discarded.

The long-term module 110 then begins a third time interval of the second length for which to sample the connection usage of the connection pool 104. Assuming that the third time interval elapses without the long-term module 110 being reset, the long-term module 110 determines a second connection usage value based on the samples collected during the third time interval. The long-term module 110 estimates a second connection pool size based on the second connection usage value. Further, the long-term module 110 adjusts the current size of the connection pool 104 to match the second connection pool size if they are different.

The spike module 112 is configured to periodically monitor connection usage of the connection pool 104 to identify when spikes in connection usage occurs. To this end, the spike module 112 is configured to determine a third connection usage value over another time interval of a third length. The third length may be the same or different from the first length of the time intervals associated with the short-term module 108 and the second length of the time intervals associated with the long-term module 110. Further, the spike module 112 estimates a third connection pool size based on its collect samples and increases the size of the connection pool 104 to match the third connection pool size.

Additionally, a decay period may also be associated with the spike module 112 increasing the size of the connection pool 104. The decay period is a time interval occurring immediately after an increase of the size of the connection pool 104 by the spike module 112. Within the decay period, the spike module 112 may reduce the size of connection pool 104 by a predetermined number of connections. In other words, the size of the connection pool 104 is decreased back to its original size immediately preceding the increase by the spike module 112. This reduction in the size of the connection pool 104 during the decay period may occur gradually at a specified rate or may be applied all at once at the end of the decay period. In this manner, the connection manager is able to account for the spike in connection usage while avoiding an oversupply of unneeded connections in the connection pool 104 after the spike has passed.

It will be appreciated that each of the short-term module 108, the long-term module 110, and the spike module 112 is configured to periodically sample connection usage at their respective sampling rates.

Figure 6:
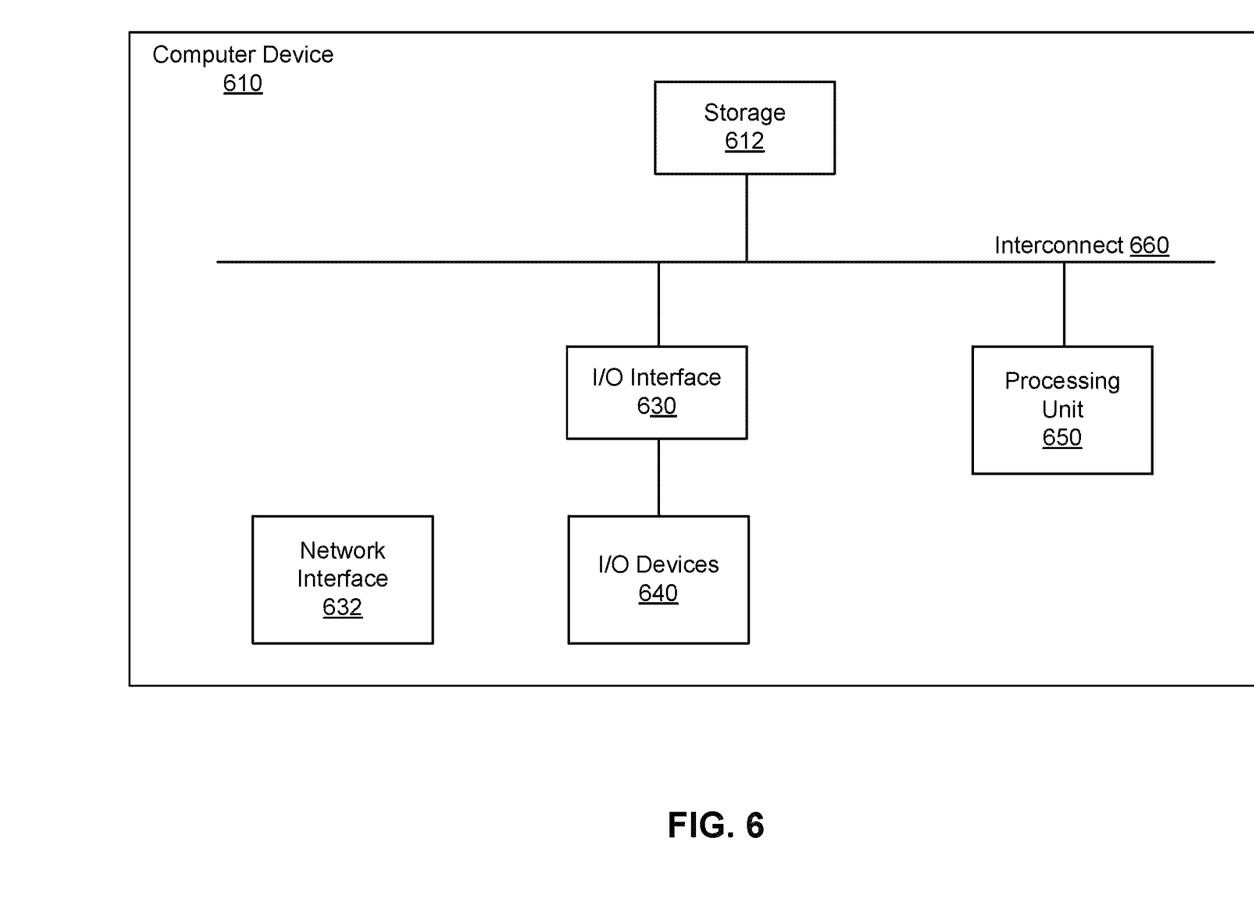
FIG. 6 is a block diagram illustrating an exemplary computing device, according to some embodiments.

In some embodiments, the operation of the connection manager 106 and its components (short-term module 108, long-term module 110, and spike module 112) can be summarized by the following formula that estimates what the size of a connection should be at a given point in time:

$$E_c = \sum_{\substack{T=c-x \\ i=c-z}}^{c} (L) S_T \cdot S_{pi} \lambda \sum_{\substack{t=c-y \\ i=c-z}}^{c} (SH) S_t \cdot S_{pi} \geq \theta \Omega S_{pi}$$

where, $E_c$=New overall connection pool size estimate at time c, $\Sigma(L)$=Long-term connection pool size estimate using an adjusted moving avg based on long-term samples ST and spike samples Spi, $\Sigma(SH)$=Short-term connection pool size estimate using an adjusted moving avg based on short-term samples St and spike samples Spi, ST=Long-term samples collected during the time period T which is the period of time represented by c-x (current time c—long-term time interval of length x), St=Short-term samples connection pool size estimate during the time period t which is the period of time represented by c-y (current time—short-term interval of length y), Spi=multiple spike samples collected at time intervals of length i $\lambda$ places conditions on $\Sigma(SH)$ such that: if $\Sigma(SH)<\theta$, then T=c, which resets $\Sigma(L)$ samples. If $\Sigma(SH)>\theta$, let $\Sigma(L)$ take effect after X in addition to $\Sigma(SH)$, $\theta$=Current pool size, and $\Omega$=Applies Independent Spi adjustments for spikes in addition to using Spi data with $\Sigma(SH)$ and $\Sigma(L)$ The data storage 114 stores various information that the applications 122 connect to the database system 102 to access. The data storage may include any type of storage medium, as described in more detail with reference to the storage 612 in FIG. 6.

The communication component 116 may be configured to communicate with various other devices, such as the other computer(s) 120 and/or other devices. In various embodiments, communication component 116 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

FIG. 1 further illustrates the other computer(s) 120, each of which includes applications 122, database 126, and communication component 128. As previously discussed, the applications 120 may be any type of application that access the database system 102. According to a particular embodiment, the applications are applications for backend server systems maintained by a service provider. The applications are configured that access data stored in the database system 102 in response to various requests by different components of the backend server systems.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
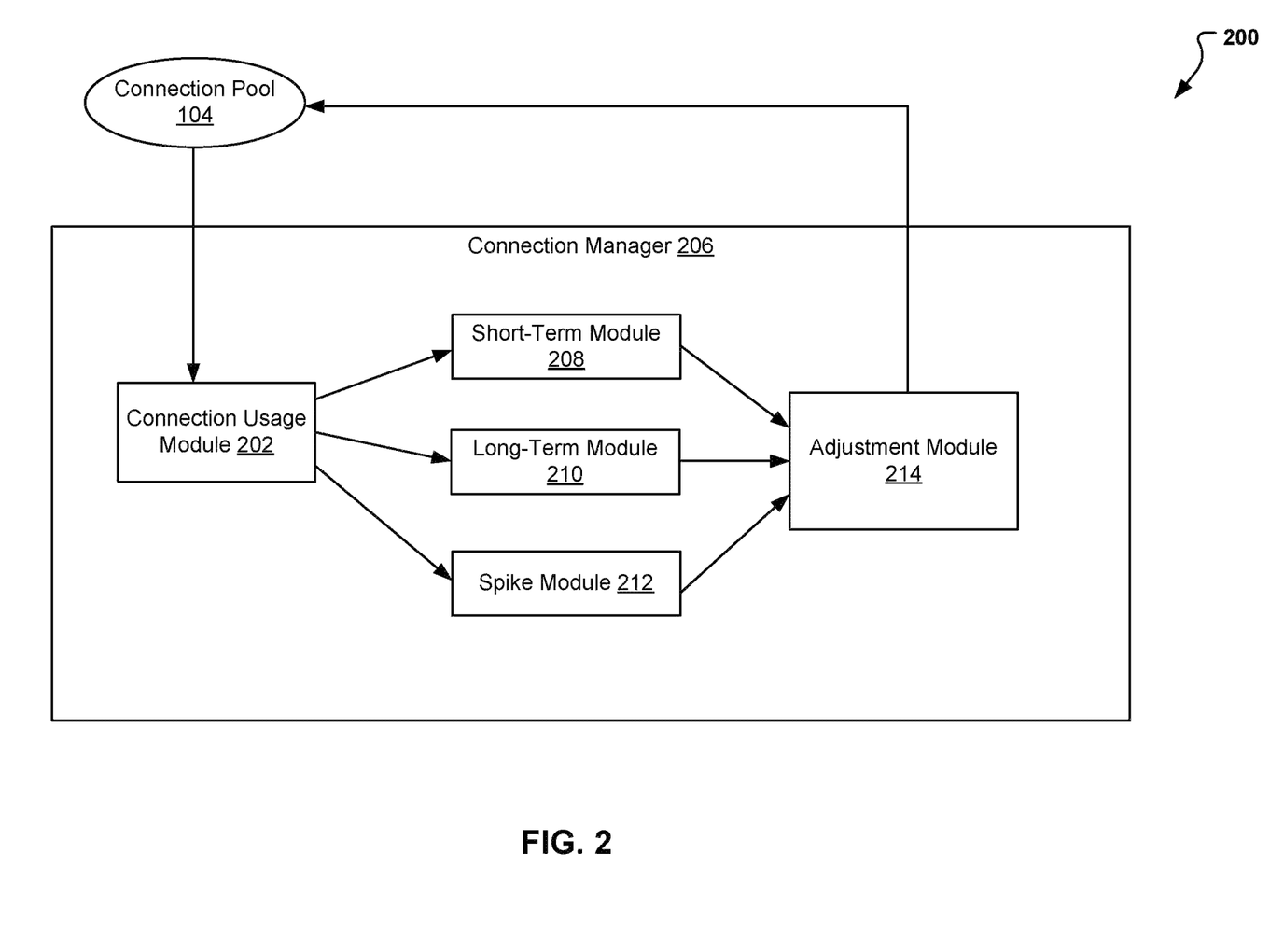
FIG. 2 illustrates a diagram illustrating a data flow for adjusting the size of a connection pool in a distributed system, according to some embodiments.

FIG. 2 illustrates a data flow diagram 200 of a connection manager 206 in accordance with another particular embodiment. As shown in FIG. 2, the connection manager 206 includes a connection usage module 202, a short-term module 208, a long-term module 210, a spike module 212, and an adjustment module 214.

According to the embodiment illustrated in FIG. 2, the short-term module 208, long-term module 210, and spike module 212 may function similarly to their counterparts illustrated in FIG. 1, except that the adjustment module 214 is configured to make any determination of whether to adjust the size of the connection pool 104. For instance, the short-term module 208 may be configured to periodically (at time intervals of a first length) sample short-term connection usage information by communicating with the connection usage module 202 (which monitors the connection pool to provide connection usage information) at a first sampling rate. For example, the short-term connection usage information indicates a first number of database connections from the connection pool 104 that were used over a time interval of the first length. For each time interval of the first length, the short-term module 208 provides the short-term connection usage information to the adjustment module 214.

The long-term module 210 may be configured to periodically (at time intervals of a second length greater than the first length) sample long-term connection usage information by communicating with the connection usage module 202 at a second sampling rate. The long-term connection usage information indicates a second number of database connections from the connection pool 104 that were used over a time interval of the second length. For each interval of the second length, the long-term module 210 provides the long-term connection usage information to the adjustment module 214.

The spike module 212 may be configured to periodically sample spike connection usage information by communicating with the connection usage module 202 at a third sampling rate. The spike connection usage information indicates a third number of database connections from the connection pool 104 that were used over a time interval of a third length. For each time interval of the third length, the spike-term module 212 provides the spike connection usage information to the adjustment module 214.

It will be appreciated that the first sampling rate may be the same as the second sampling rate and/or the third sampling rate. In other implementations, the first sampling rate may be different from the second sampling rate and/or the third sampling rate. Similarly, the second sampling rate may be the same as the third sampling rate or in other implementations, may be different than the third sampling rate.

The adjustment module 214 is configured to determine whether to adjust the size of the connection pool 104 based on the short-term connection usage information, the long-term connection usage information, and/or the spike connection usage information. For example, the adjustment module 214 receives connection usage information and determines the usage information type (e.g., short-term connection usage information, long-term connection usage information, or spike connection usage information. According to certain embodiments, the adjustment module determines usage information type based on an identifier included in the connection usage information. In other embodiments, the usage information type is determined based on whether the connection usage information is received from the short-term module 208, the long-term module 210, or the spike module 212.

If the adjustment module 214 determines that the usage information type of the connection usage information corresponds to short-term connection usage information, the adjustment module 214 calculates a first estimated connection pool size based on short-term connection usage information. If the first estimated connection pool size is greater than the current size of the connection pool, the adjustment module 214 increases the current size of the connection pool to match the first estimated connection pool size. Additionally, the adjustment module 214 resets the long-term module 210 (e.g., the time interval of the long-term module 210) and causes the long-term module 210 discard all of the samples collected up to this point. The long-term module 210 subsequently begins a new time interval of the second length for which to sample connection usage of the connection pool 104.

If the adjustment module 214 determines that the usage information type of the connection usage information corresponds to long-term connection usage information, the adjustment module 214 calculates a second estimated connection pool size based on long-term connection usage information. The adjustment module 214 then adjusts the current size of the connection pool 104 to match the second estimated connection pool size. This may include increasing, decreasing, or maintaining the current size of the connection pool 104.

If the adjustment module 214 determines that the usage information type of the connection usage information corresponds to spike connection usage information, the adjustment module 214 calculates a third estimated connection pool size based on spike connection usage information. The adjustment module 214 then adjusts the current size of the connection pool 104 to match the third estimated connection pool size.

As previously discussed, a decay period may be initiated subsequent to an increase in the size of the connection pool 104 based on spike connection usage information. Within the decay period, the adjustment module 214 may reduce the size of connection pool 104 by a number of connections such that at the end of the decay period, the size of the connection pool 104 may be adjusted back to its size immediately preceding the increase based on the spike connection usage information. The adjustment made during the decay period may occur gradually at a specified rate or may be applied all at once at the end of the decay period. In certain embodiments, during the decay period, no other adjustments may be made to the connection pool 104.

Figure 3:
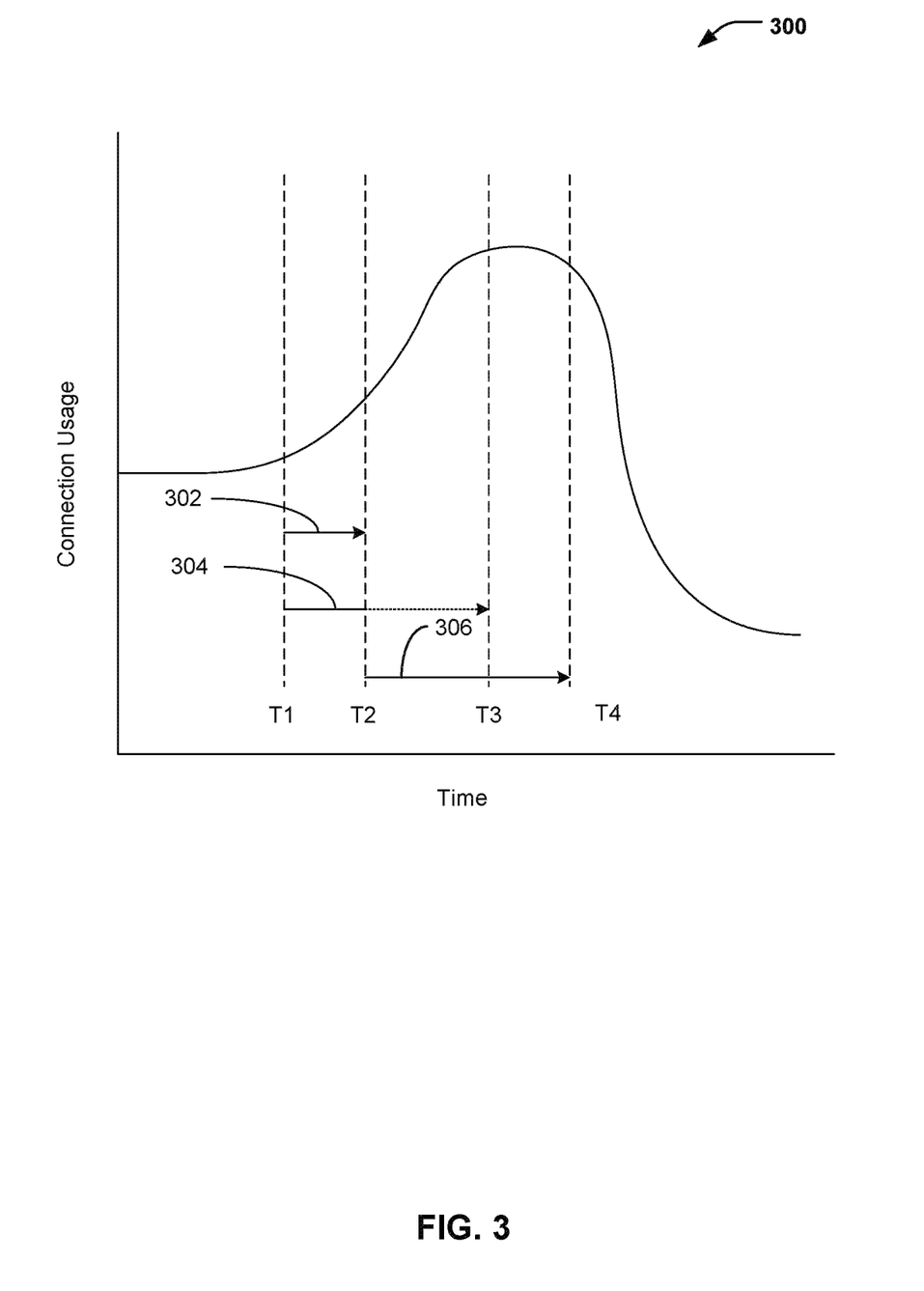
FIG. 3 illustrates a graph depicting a scenario for operation of the connection manager, according to some embodiments.

FIG. 3 illustrates an example graph 300 representing connection usage over one or more periods of time according to a particular embodiment. Graph 300 depicts a first time interval 302 between time T1 and T2, a second time interval 304 between times T1 and T3, and third time interval 306 between times T2 and T4. The first time interval 302 corresponds to a timeframe considered by a short-term module (e.g., short-term module 108 and/or short-term module 208), and the second time interval 304 corresponds to another timeframe considered by a long-term module (e.g., long-term module 110 and/or long-term module 210). The second time interval 304 is the same length of time as the third time interval 306.

Based on the connection usage illustrated by graph 300, the short-term module causes the size of the connection pool to increase at time T2. Also at time T2, the long-term module, and thus the second time interval 304, is reset. As such, any samples of connection usage collected by the long-term module between times T1 and T2 (e.g., the first time interval 302 are discarded). At time T2, the long-term module begins the third time interval 306 for sampling the connection usage. The third time interval 306 elapses without being reset. As a result, at time T4, the long-term module estimates a connection pool size based on the samples of connection usage collected during the third time interval 306.

Figure 4:
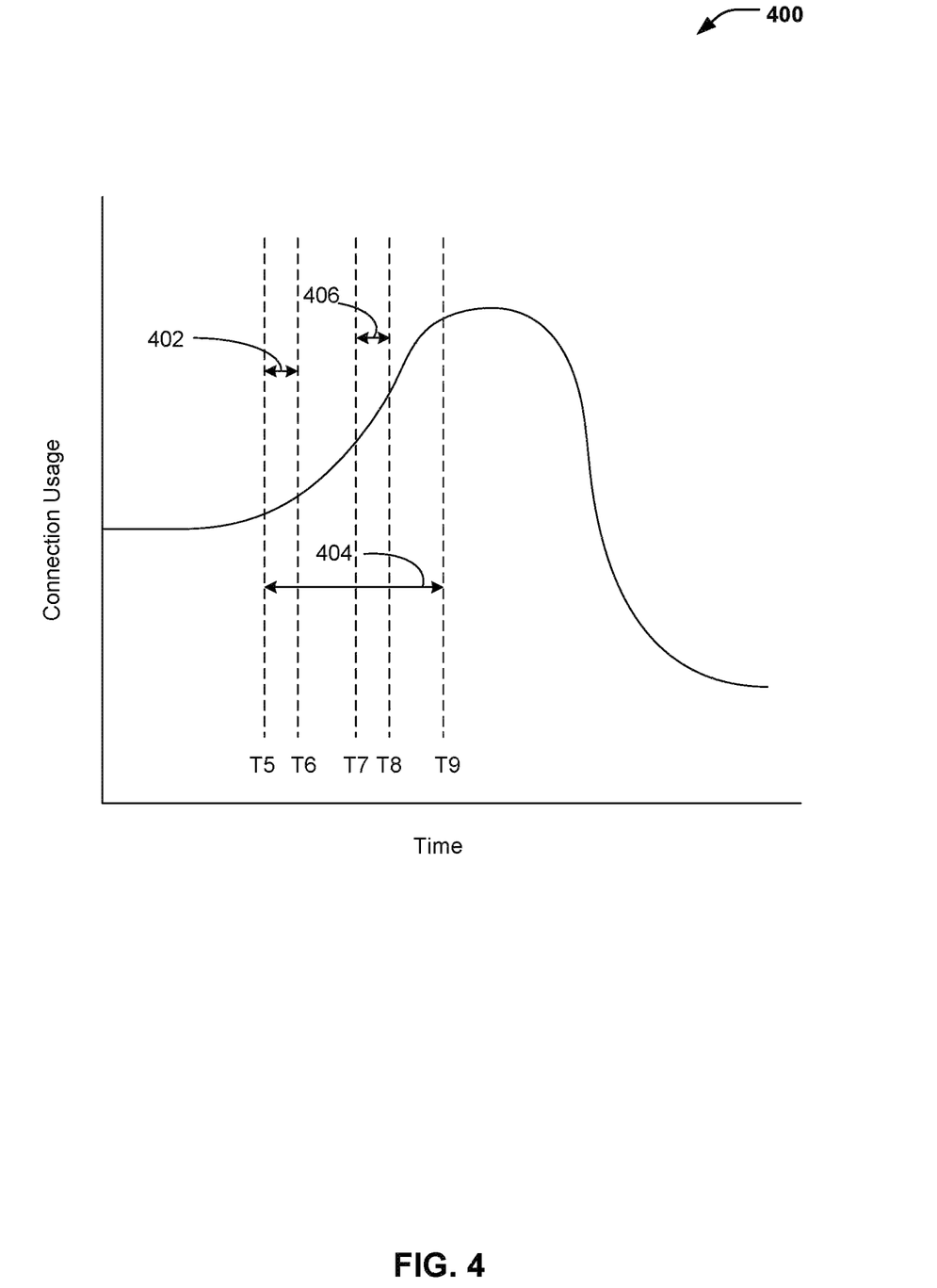
FIG. 4 illustrates a graph depicting another scenario for operation of the connection manager, according to some embodiments

FIG. 4 illustrates an example graph 400 representing connection usage over one or more periods of time according to another particular embodiment. Graph 400 depicts a fourth time interval 402 between times T5 and T6, a fifth time interval 404 between times T5 and T9, and a sixth time interval 406 between times T7 and T8. The fourth time interval 402 corresponds to a first spike detected by spike module 112/212, and the fifth time interval 404 corresponds to a decay period associated with the first spike. The sixth time interval 406 corresponds to a second spike detected by the spike module 112/212 within the decay period (fifth time interval 404).

Based on the connection usage illustrated by graph 400, the spike module 112/212 causes the connection pool to increase in size in response to the first spike (fourth time interval 402) at time T6. However, since the second spike (sixth time interval 406) occurs within the decay period (fifth time interval 404), the connection pool size is unchanged in response to the second spike.

Figure 5:
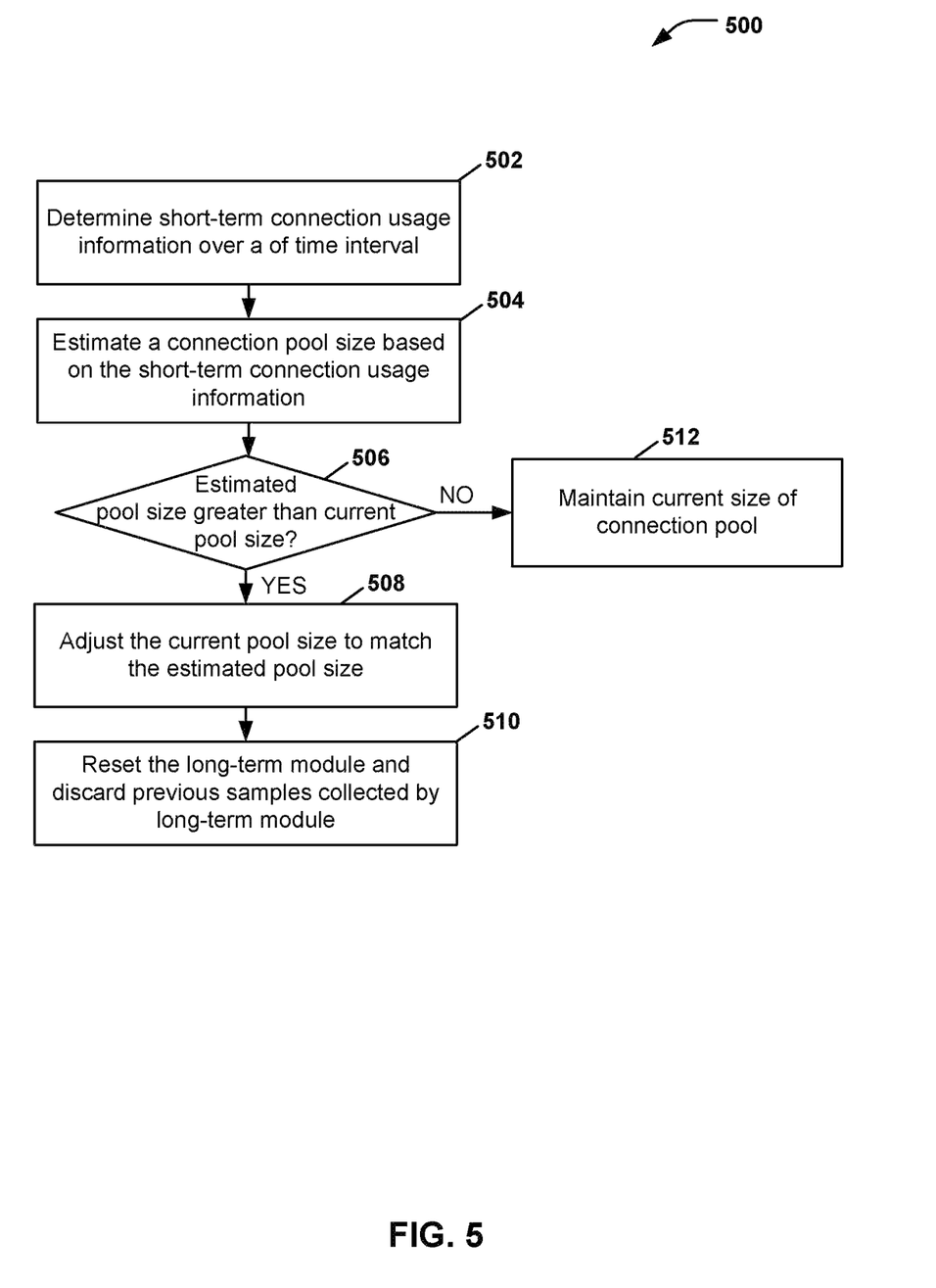
FIG. 5 is a flow diagram illustrating a method for adjusting the size of a connection pool in a database system based on short-term connection usage information, according to some embodiments.

FIG. 5 illustrates an example flow diagram of a method 500 for adjusting the size of a connection pool based on short-term connection usage information, according to one or more particular embodiments. The method 500 may be performed by a short-term module, such as the short-term module 108 of the database system 102 and/or the short-term module 208 in combination with the adjustment module 214 of FIG. 2. The method begins at step 502, where the short-term module determines short-term connection usage information over a time interval.

At step 504, the short-term module estimates a connection pool size based on the short-term connection usage information. At step 506, the short-term module determines whether the estimated pool size is greater than the current pool size. If not, the method 500 proceeds to step 512 where the current size of the connection pool is maintained. If the estimated pool size is greater than the current pool size, at step 508, the short-term module causes the current pool size to be adjusted to match the estimated pool size (e.g., to increase the number of connections in the connection pool to match the estimated pool size). At step 410, the long-term module (e.g., long term module 110/210) to be reset and all the previously collected samples of connection usage information by the long-term module to be discarded.

Example Computing Device

Turning now to FIG. 6, a block diagram of one embodiment of computing device (which may also be referred to as a computing system) 610 is depicted. Computing device 610 may be used to implement various portions of this disclosure including any of the components illustrated in FIG. 1 and FIG. 2. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
   receiving connection usage information corresponding to a connection pool maintained by a database system, the connection usage information associated with a first timeframe;
   determining an information type corresponding to the connection usage information;
   based on the information type, selecting a particular usage threshold from a set of usage thresholds;
   based on whether the connection usage information satisfies the particular usage threshold, determining whether to adjust a size of the connection pool;
   identifying a first spike in network traffic during an interval;

responsive to the identifying, estimating a new connection pool size for the connection pool based on the first spike;

adjusting a current connection pool size of the connection pool to the new connection pool size, the new connection pool size being greater than the current connection pool size;

subsequent to the identifying the first spike in network traffic, identifying a second spike in network traffic; and based on determining that the second spike occurred within a predetermined amount of time from the first spike, maintaining a previous number of connections in the connection pool.

2. The method of claim 1, wherein the information type corresponds to at least one of short-term connection usage information, long-term connection usage information, or spike connection usage information.

3. The method of claim 1, wherein the information type corresponds to short-term connection usage information, wherein the method further comprises:

increasing the size of the connection pool based on the short-term connection usage information satisfying the particular usage threshold.

4. The method of claim 1, wherein the information type corresponds to long-term connection usage information and the particular usage threshold comprises a usage threshold range, and wherein the determining whether to adjust the size of the connection pool further comprises:

comparing the long-term connection usage information with the usage threshold range.

5. The method of claim 1, wherein the connection usage information is calculated based on sampling connection usage of the connection pool over a first interval at a first sampling rate.

6. The method of claim 1, further comprising:

determining that a predetermined amount of time has elapsed since the identifying the first spike in the network traffic; and responsive to the determining, terminating a second number of connections in the connection pool.

7. The method of claim 1, wherein the estimating the new connection pool size for the connection pool is further based on second connection usage information, the connection pool being currently associated with a current pool connection size; and wherein the adjusting the current connection pool size is further based on the new connection pool size.

8. A system, comprising:

a connection pool including one or more database connections;

a short-term module configured to:

calculate first connection usage information based on a first number of connections being used in a connection pool over a first interval;

estimate a first connection pool size based on the first connection usage information;

a long-term module configured to:

calculate second connection usage information based on a second number of connections being used in a connection pool over a second interval; and estimate a second connection pool size based on the second connection usage information; and an adjustment module configured to:

responsive to determining that first connection pool size is greater than a current number of database connections in the connection pool and prior to calculating the second connection usage information:

adjust the current number of database connections to match the first connection pool size; and reset the long-term module before an expiration of the second interval.

9. The system of claim 8, wherein the adjustment module is further configured to:

subsequent to resetting the long-term module, adjust the connection pool to have the second connection pool size.

10. The system of claim 8, wherein the first connection usage information is calculated based on sampling connection usage of the connection pool over the first interval at a first sampling rate, and wherein the second connection usage information is calculated based on sampling connection usage of the connection pool over the second interval at a second sampling rate.

11. The system of claim 10, wherein the adjustment module is further configured to:

discard one or more samples of connection usage information sampled by the long-term module responsive to determining that first connection pool size is greater than the current number of database connections in the connection pool and prior to calculating the second connection usage information.

12. The system of claim 8, further comprising: a spike module configured to:

identify a first spike in network traffic during a third interval; and estimate a third connection pool size for the connection pool based on the first spike, wherein the adjustment module is further configured to:

increase a connection pool size of the connection pool to the third connection pool size.

13. The system of claim 12, wherein the first spike in network traffic is associated with a decay period in which the connection pool size cannot be further increased based on subsequently detected spikes in network traffic within the decay period.

14. The system of claim 8, wherein the second interval is longer in duration than the first interval.

15. A non-transitory computer readable medium storing computer-executable instructions that in response to execution by one or more hardware processors, causes a database system to perform operations comprising:

receiving connection usage information corresponding to a connection pool maintained by the database system, the connection usage information comprising short-term connection usage information associated with a first timeframe and long-term connection usage information associated with a second timeframe that is greater than the first timeframe;

determining whether an information type of the received connection usage information is the short-term connection usage information or the long-term connection usage information;

based on the determined information type, selecting a particular usage threshold from a set of usage thresholds; and based on whether the received connection usage information satisfies the particular usage threshold, determining whether to adjust a size of the connection pool before an expiration of the second timeframe.

16. The non-transitory computer readable medium of claim 15, wherein the information type further comprises spike connection usage information.

17. The non-transitory computer readable medium of claim 15, wherein the received information type corresponds to the short-term connection usage information, and wherein the operations further comprise:

increasing the size of the connection pool based on the short-term connection usage information satisfying the particular usage threshold.

18. The non-transitory computer readable medium of claim 15, wherein the received information type corresponds to the long-term connection usage information and the particular usage threshold comprises a usage threshold range, and wherein the determining whether to adjust a size of the connection pool further comprises:

comparing the long-term connection usage information with the usage threshold range.

19. The non-transitory computer readable medium of claim 15, wherein the operations further comprise:

identifying a first spike in network traffic during an interval;

responsive to the identifying, estimating a new connection pool size for the connection pool based on the first spike; and adjusting a current connection pool size of the connection pool to the new connection pool size, the new connection pool size being greater than the current connection pool size.

20. The non-transitory computer readable medium of claim 19, wherein the operations further comprise:

subsequent to the identifying the first spike in network traffic, identifying a second spike in network traffic; and based on determining that the second spike occurred within a predetermined amount of time from the first spike, maintaining a previous number of connections in the connection pool.

\* \* \* \* \*